(12) United States Patent
Bobak et al.

(10) Patent No.: US 11,598,868 B2
(45) Date of Patent: Mar. 7, 2023

(54) MICROWAVE SINGLE PIXEL IMAGER (MSPI)

(71) Applicant: The Government of the United States of America, as represented by the Secretary of the Navy, Arlington, VA (US)

(72) Inventors: Justin P. Bobak, Silver Spring, MD (US); Hatim F. Alqadah, Ashburn, VA (US); Scott M. Rudolph, Washington, DC (US); Michael W. Nurnberger, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 16/911,417

(22) Filed: Jun. 25, 2020

(65) Prior Publication Data
US 2021/0255315 A1 Aug. 19, 2021

Related U.S. Application Data

(60) Provisional application No. 62/867,431, filed on Jun. 27, 2019.

(51) Int. Cl.
*G01S 13/90* (2006.01)
*G01S 7/03* (2006.01)
*H01Q 15/14* (2006.01)

(52) U.S. Cl.
CPC ............ *G01S 13/9021* (2019.05); *G01S 7/03* (2013.01); *H01Q 15/148* (2013.01)

(58) Field of Classification Search
CPC ..... G01S 13/9021; G01S 7/03; H01Q 15/148; H01Q 3/46
See application file for complete search history.

(56) References Cited

U.S. PATENT DOCUMENTS

| 8,692,708 B2 * | 4/2014 | Nogueira-Nine ..... G01S 13/887 342/179 |
| 8,941,061 B2 | 1/2015 | Gopalsami et al. |
| | | (Continued) |

OTHER PUBLICATIONS

SEan Victor Hum et al, reconfigurable reflectarrays and array lenses for dynamic antenna beam control: a review, Jan. 2014, IEEE Transactions on Antennas and Propagation, vol. 62, issue 1, pp. 183-198 (Year: 2014).*

(Continued)

*Primary Examiner* — Timothy A Brainard
(74) *Attorney, Agent, or Firm* — US Naval Research Laboratory; Suresh Koshy (57) ABSTRACT

A microwave single pixel imager apparatus and method of using same. Sampling a targeted scene includes the following. A plurality of modulated antenna patterns is generated using a reflectarray. A plurality of antenna temperatures respectively corresponding to the plurality of modulated antenna patterns is measured. A retrieved scene corresponding to the sampled targeted scene is generated. Generating a retrieved scene corresponding to the sampled targeted scene includes the following. The plurality of modulated antenna patterns and the corresponding plurality of antenna temperatures are fed into a compressive sensing imaging algorithm.

25 Claims, 8 Drawing Sheets

(56) References Cited

U.S. PATENT DOCUMENTS

2008/0198074 A1* 8/2008 Walton ................ H01Q 9/0442
343/700 MS
2016/0314602 A1 10/2016 Brady et al.
2017/0254750 A1* 9/2017 Xin ........................ H03M 7/30

OTHER PUBLICATIONS

International Preliminary Report on Patentability, dated Dec. 28, 2021.
Davenport et al., Contstrained Adaptive Sensing, IEEE Transactions of Signal Processing, Oct. 16, 2016, pp. 5437-5449, vol. 64, No. 20. IEEE, Piscataway. NJ, USA.
Eldar et al., Compressive Sensing Theory and Applications, 2012, pp. 1-68, Cambridge University Press, Cambridge, UK.
Baraniuik R., A Lecture on Compressive Sensing, IEEE Signal Processing Magazine, Jul. 2007, pp. 1-9, vol. 24, No. 4, IEEE. Piscataway, NJ, USA.
Alsaafin et al., Compressive Sensing Super Resolution from Multiple Observations with Application to Passive Millimeter Wave Images, Digital Signal Processing, Jan. 6, 2016, pp. 180-190, vol. 50, Elsevier, Amsterdam, Netherlands.

* cited by examiner

MICROWAVE SINGLE PIXEL IMAGER (MSPI)

CROSS-REFERENCE TO RELATED APPLICATIONS

This Application claims the benefit of U.S. Provisional Application Ser. No. 62/867,431 filed on 27 Jun. 2019, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 111393-US2.

BACKGROUND OF THE INVENTION

Field of the Invention

This invention relates in general to a microwave single pixel radiometric system, and in particular to a microwave single pixel radiometric system having a reconfigurable reflectarray antenna.

Description of the Related Art

Radio frequency systems used for remote sensing have relatively large apertures to achieve desired beam directivity, which drives angular resolution. The increasing use of smaller platforms in space, air, and on the ground/sea, requires smaller sensor systems. Receivers, including radiometer receivers, can and have been miniaturized, but the aperture physical dimensions have not been reduced, except when the mission allows the resolution to be proportionately reduced, in turn allowing the beamwidth to be relatively large. The frequency of operation can be increased, leading to smaller physical apertures that have the same electrical size, but them are missions that must be performed with specific microwave frequency bands due to the wavelength-dependent sensitivity of environmental parameters.

For scenes that are sufficiently compressible, compressive sensing recovery techniques can be used. This means 1) a scene can be represented by a limited number (often substantially fewer than the number of pixels in an image) of representation basis elements. Further, 2) A set of sampling basis functions that are not unique and do not need to be known apriori, so that any set of sampling bases, or sampling basis functions, that meet the proper criteria, can be used to sample the scene and retrieve a representative image. AlSaafn, W, et al., "Compressive sensing super resolution from multiple observations with application to passive millimeter wave images," Digital Signal Processing, 2015, pp. 180-190, Vol. 50, Elsevier, Amsterdam, Netherlands, incorporated herein by reference, showed that super-resolution, meaning resolution greater than that achievable by a diffraction-limited system, can be incorporated with compressive sensing.

The single pixel camera is a specific hardware implementation of compressive sensing principles. The technique was originally demonstrated optically, in which an image is focused on an array of digital micromirrors, as discussed in Baraniuk, R "A lecture on compressive sensing," IEEE Signal Processing Magazine, June 2007, pp. 1-9, Issue 24, No. 4, IEEE, Piscataway, N.J., incorporated herein by reference. The reflection from the array was then focused into a single photodetector. The mirrors were turned "on" or "off" (i.e., direction of reflection directed towards or away from the photodetector) according to a randomly-generated set of sequences, forming the sampling bases mentioned above). A photodetector measurement was taken for each sequence of mirror settings. The output measurements and the associated sequences were combined in an algorithm that generated an image. A similar technique was used at millimeter wave frequencies at Northwestern University and Argonne National Labs, as discussed in U.S. Pat. No. 8,941,061 to Gopalsami, et al., incorporated herein by reference. A traditional architecture millimeter wave receiver was used as the single sensor. An image was formed on a lithographically-produced, oversized mask that allowed radiation through some "pixels" and blocked radiation incident upon other "pixels". This mask was carefully positioned and translated in a plane perpendicular to the radiometer boresight in order to form the sampling bases mentioned above.

BRIEF SUMMARY OF THE INVENTION

An embodiment of the invention includes a method. A targeted scene is sampled. Sampling a targeted scene includes the following. A plurality of modulated antenna patterns is generated using a reflectarray; and a plurality of antenna temperatures respectively corresponding to the plurality of modulated antenna patterns is measured. A retrieved scene corresponding to the sampled targeted scene is generated. Generating a retrieved scene corresponding to the sampled targeted scene includes the following. The plurality of modulated antenna patterns and the corresponding plurality of antenna temperatures are fed into a compressive sensing imaging algorithm.

Another embodiment of the invention includes a microwave single pixel imager apparatus. The apparatus includes a reflectarray. The reflectarray includes a plurality of independently controllable reflector elements. Each reflector element of the plurality of independently controllable reflector elements produces a corresponding independently controllable reflection coefficient.

DETAILED DESCRIPTION OF THE INVENTION

Figure 1:
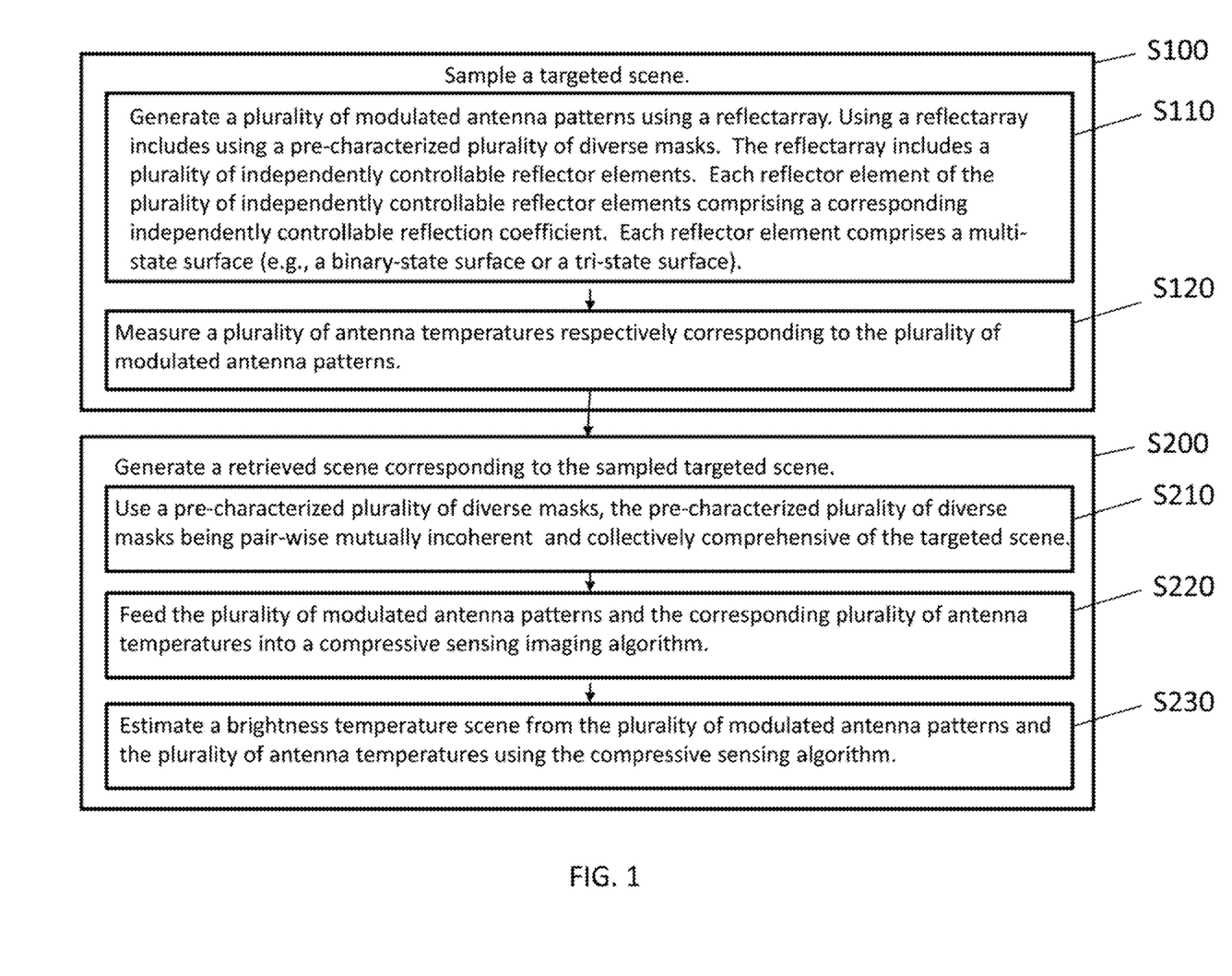
FIG. 1 is a flowchart of a method according to an embodiment of the invention.

An embodiment of the invention includes a method and is described as follows with reference to, by way of example, FIG. 1. A targeted scene is sampled, as in Step S100. Sampling a targeted scene includes the following. A plurality of modulated antenna patterns is generated using a reflectarray, as in Step S110. In an embodiment of the invention, the reflectarray is a receive-only reflectarray. In another embodiment of the invention, the reflectarray is a reconfigurable reflectarray, that is, a reflectarray capable of being configurable as a transmitter or as a receiver. A plurality of antenna temperatures respectively corresponding to the plurality of modulated antenna patterns is measured, as in Step S120. A retrieved scene corresponding to the sampled targeted scene is generated, as in Step S200. Generating a retrieved scene corresponding to the sampled targeted scene includes the following. The plurality of modulated antenna patterns and the corresponding plurality of antenna temperatures are fed into a compressive sensing imaging algorithm, as in Step S220.

Optionally, the generating a plurality of modulated antenna patterns using a receive-only reflectarray using a pre-characterized plurality of diverse masks, as in Step S210. The pre-characterized plurality of diverse masks are pair-wise mutually incoherent and collectively comprehensive of the targeted scene.

For the purpose of this patent application, pair-wise mutually incoherent is a term of art and is defined as follows. Let $T_{scene}$ be a brightness temperature image consisting of n pixels. $T'_{scene}$ is defined as its finite approximation, when $$\|T'_{scene} - T_{scene}\|_2 < v, \quad (1)$$

for some tolerance v>0, and when $T'_{scene}$ satisfies $$T_{scene} = \Psi^T c, \quad (2)$$

where $\Psi$ is an n×n orthonormal basis and c is a n dimensional vector of coefficients. The quantity $T'_{scene}$ is further said to be a sparse approximation to $T_{scene}$ when only k<<n coefficients of care non-zero. Such a vector c satisfying this property is said to be k-sparse. Let $\Phi$ be a m×n matrix comprising m different antenna patterns that measures the n pixel scene $T_{scene}$. There are two characterizations of mutually incoherent antenna patterns. The first is based on a restricted isometry principle ("RIP") and the second is based on mutual coherence. Define the matrix $A = \Phi \Psi^T$. For some appropriate scaling of A, A satisfies a RIP condition of order k, if there is a constant $\delta_k$ satisfying $$(1-\delta_k)\|x\|_2^2 \leq \|Ax\|_2^2 \leq (1+\delta_k)\|x\|_2^2 \quad (3)$$

for all n dimensional vectors that are k-sparse. A matrix that satisfies this can be thought of as nearly orthonormal when restricted to only k-sparse vectors. For retrieval of a k-sparse image we aim to minimize a RIP condition of order 2 k for the matrix A. For example, DAVENPORT ET AL., Constrained Adaptive Sensing, IEEE Transactions of Signal Processing, 16 Oct. 2016, pp. 5437-5449, Vol. 64, No. 20, IEEE, Piscataway, N.J., USA, incorporated herein by reference, shows that when A satisfies a RIP condition of order 2 k with $\delta_{2k} < \sqrt{2}-1$ for a measurement vector b corrupted with independent white Gaussian noise with variance $\sigma^2$ the expected quality of the reconstruction is bounded by $$C \frac{k\sigma^2 n \log n}{\|A\|_F^2},$$

where C is some constant that depends on $\delta_{2k}$. Which basically tells us if the patterns are incoherent enough we can reduce our error by either making $\delta_{2k}$ smaller or maybe by finding a basis for which k is smaller. The mutual coherence of a matrix A is a little bit easier to understand and it is defined as $$\mu = \max_{i,j,i \neq j} \left| \frac{a_i^T a_j}{\|a_i\|_2 \|a_j\|_2} \right| \quad (4)$$

which is the largest pairwise correlation between any two columns of matrix A. Mutual coherence could be linked to the RIP. For example, as discussed in ELDAR ET AL., Compressive Sensing Theory and Applications, 2012, pp. 1-68, Cambridge University Press, Cambridge, UK., incorporated herein by reference, matrix A satisfies the RIP of order k with constant $\delta_k = (k-1)\mu$, for all $k < 1/\mu$. Thus, as the mutual coherence of A goes down so does its RIP constant. So, again, more sparsity is favorable. In summary, either definition of "incoherence" is acceptable as a guiding principle in antenna pattern design according to an embodiment of the instant invention. The RIP gives a more precise characterization in terms of mathematical guarantees for retrieval of the image coefficients c for compressive sensing algorithms. However, it is difficult to compute and/or verify. Mutual coherence is easy to compute, however, it is not an absolute requirement. In other words, the compressive sensing algorithm may still be able to perform satisfactorily even if it does not meet the mutual coherence conditions. Nevertheless, the aim is to reduce the mutual coherence as much as possible.

Optionally, the pre-characterized plurality of diverse masks include a plurality of pre-characterized randomly generated masks. For the purpose of this patent application, the phrase randomly generated masks is a term of art and is defined herein as masks exhibiting a random distribution of electromagnetic reflection coefficients reconfigured through controllable reflector elements. The reflection coefficients encompass randomly generated amplitude and phase characteristics drawn from a discrete categorical distribution with predefined probabilities.

Optionally, a number of the plurality of modulated antenna patterns and a number of the plurality of antenna temperatures depend on an expected sparsity level, as discussed above.

Optionally, the comprehensive sensing imaging algorithm includes a comprehensive sensing imaging algorithm based on convex optimization, a comprehensive sensing imaging algorithm based on greedy methods, or a comprehensive sensing imaging algorithm based on non-convex optimization.

Optionally, the compressive sensing imaging algorithm includes a plurality of algorithm parameters. Examples of such algorithm parameters include penalty term weights. The generating a retrieved scene corresponding to the sampled targeted scene includes the following. The comprehensive sensing imaging algorithm is calibrated. Calibrating the comprehensive sensing imaging algorithm includes optimizing the plurality of algorithm parameters. Feeding the plurality of modulated antenna patterns and the corresponding plurality of antenna temperatures into a compressive sensing imaging algorithm includes the following. The optimized plurality of algorithm parameters is fed into the compressive sensing imaging algorithm.

Optionally, generating a retrieved scene corresponding to the sampled targeted scene includes estimating a brightness temperature scene from the plurality of modulated antenna patterns and the plurality of antenna temperatures using the compressive sensing algorithm, as in Step S230.

Optionally, the reflectarray includes a plurality of independently controllable reflector elements. Each reflector element of the plurality of independently controllable reflector elements includes, or produces, a corresponding, independently controllable, standard reflection coefficient. Optionally, the corresponding independently controllable reflection coefficient includes a corresponding, independently controllable, standard reflection coefficient phase. The corresponding independently controllable reflection coefficient includes a reflection coefficient amplitude that is approximately 1. One of ordinary skill in the art will readily appreciate that the reflection coefficient amplitude relates to a signal-to-noise ratio, where in this case, the noise includes all the various standard radiometric errors. The higher the signal-to-noise ratio, the further away from one the reflection coefficient amplitude is permitted to be. Optionally, the corresponding independently controllable reflection coefficient phase is limited to two states: a nominal phase state and a second state about 90° from the nominal phase state, or about 180° from the nominal phase state. Optionally, each reflector element includes a standard multi-state surface. Examples of such standard multi-state surfaces include a standard binary-state surface, a standard tri-state surface, or a standard quad-state surface. Optionally, the binary-state surface includes a standard piezoelectric actuator, a standard electromechanical actuator, a standard mechanical actuator, a standard microelectromechanical actuator, a standard fluidic actuator, or a standard nonlinear actuator, and the tri-state surface includes a standard piezoelectric actuator, a standard electromechanical actuator, a standard mechanical actuator, a standard microelectromechanical actuator, a standard fluidic actuator, or a standard nonlinear actuator. One of ordinary skill in the art will readily appreciate that other types of actuators can be used in alternative embodiments of the invention.

Another embodiment of the invention includes a microwave single pixel imager apparatus 100 and is described as follows with reference to, by way of example, FIGS. 2-5. The apparatus 100 includes a reflectarray 110. The reflectarray includes a plurality of independently controllable reflector elements 120, 122. Each reflector element of the plurality of independently controllable reflector elements 120, 122 includes, or produces, a corresponding independently controllable reflection coefficient. In an embodiment of the invention, the reflectarray 110 is a receive-only reflectarray. In another embodiment of the invention, the reflectarray 110 is a reconfigurable reflectarray, that is, a reflectarray capable of being configurable as a transmitter or as a receiver.

Figure 2:
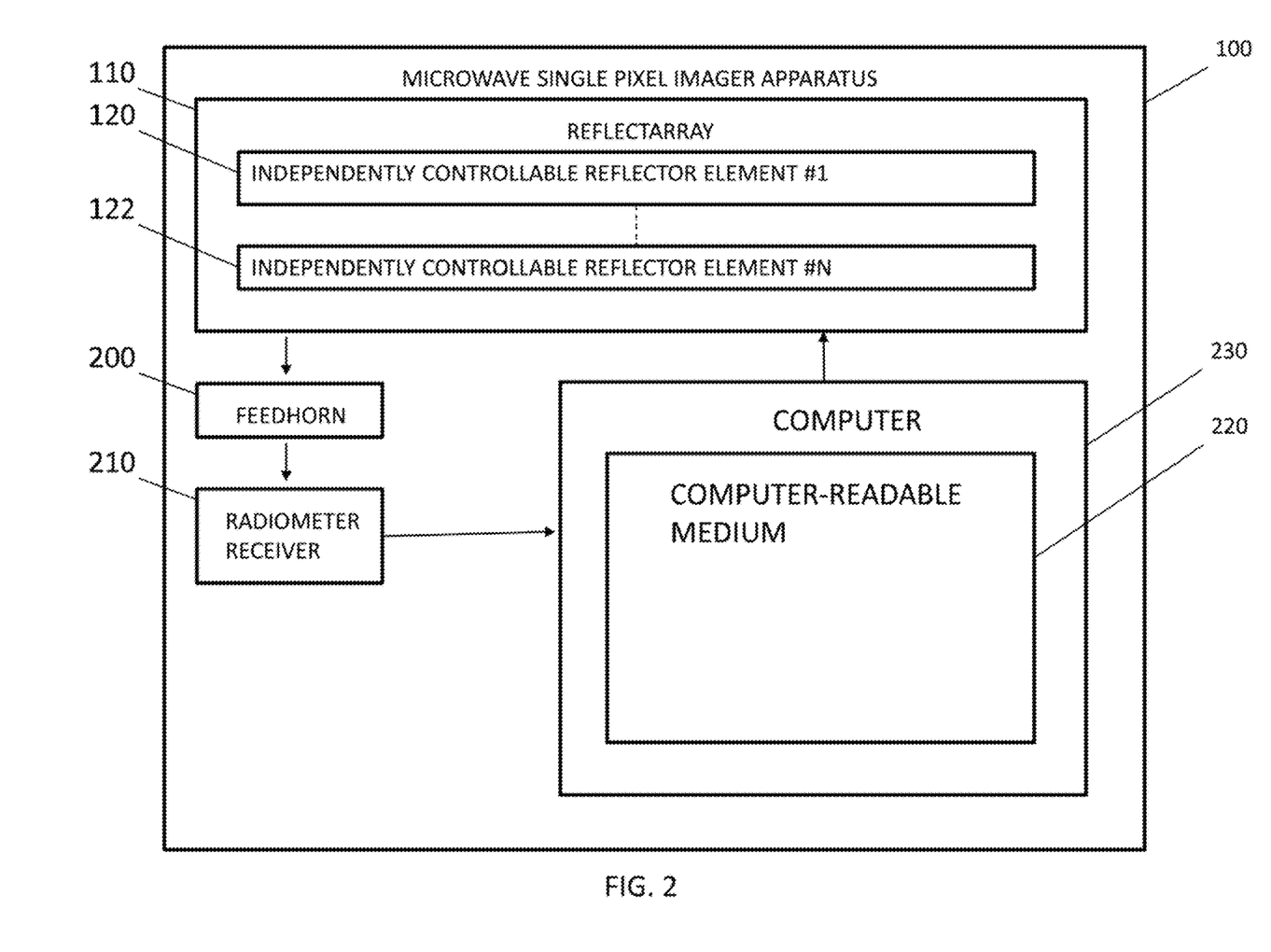
FIG. 2 is a block diagram of microwave single pixel imager apparatus according to an embodiment of the invention.

Optionally, the corresponding independently controllable reflection coefficient includes a corresponding independently controllable reflection coefficient phase. The corresponding independently controllable reflection coefficient includes a reflection coefficient amplitude of about one. Optionally, the corresponding independently controllable reflection coefficient phase includes a nominal phase state, about 90° from the nominal phase state, or about 180° from the nominal phase state.

Figure 3:
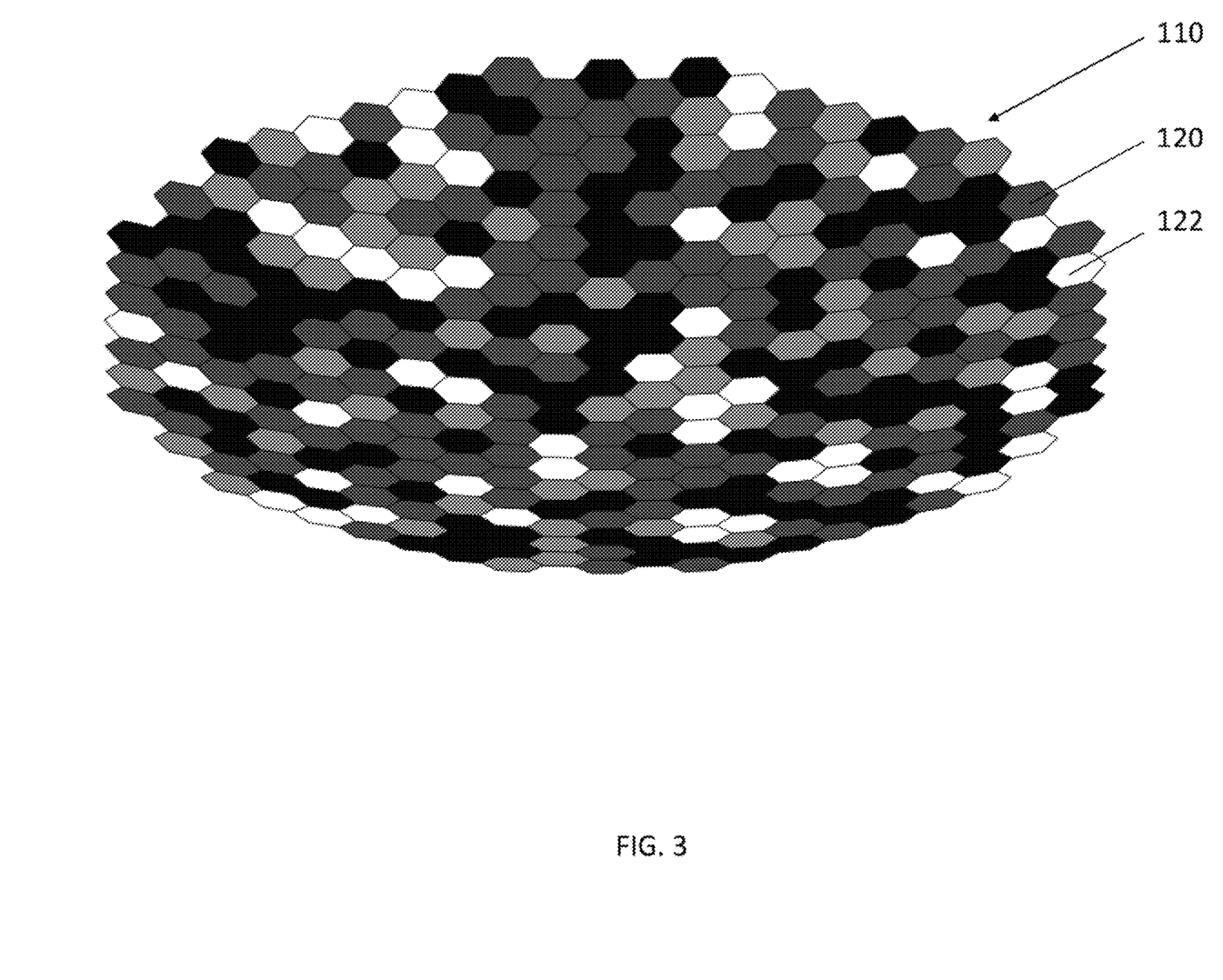
FIG. 3 is a perspective view of a reflectarray according to an embodiment of the invention.
Figure 4:
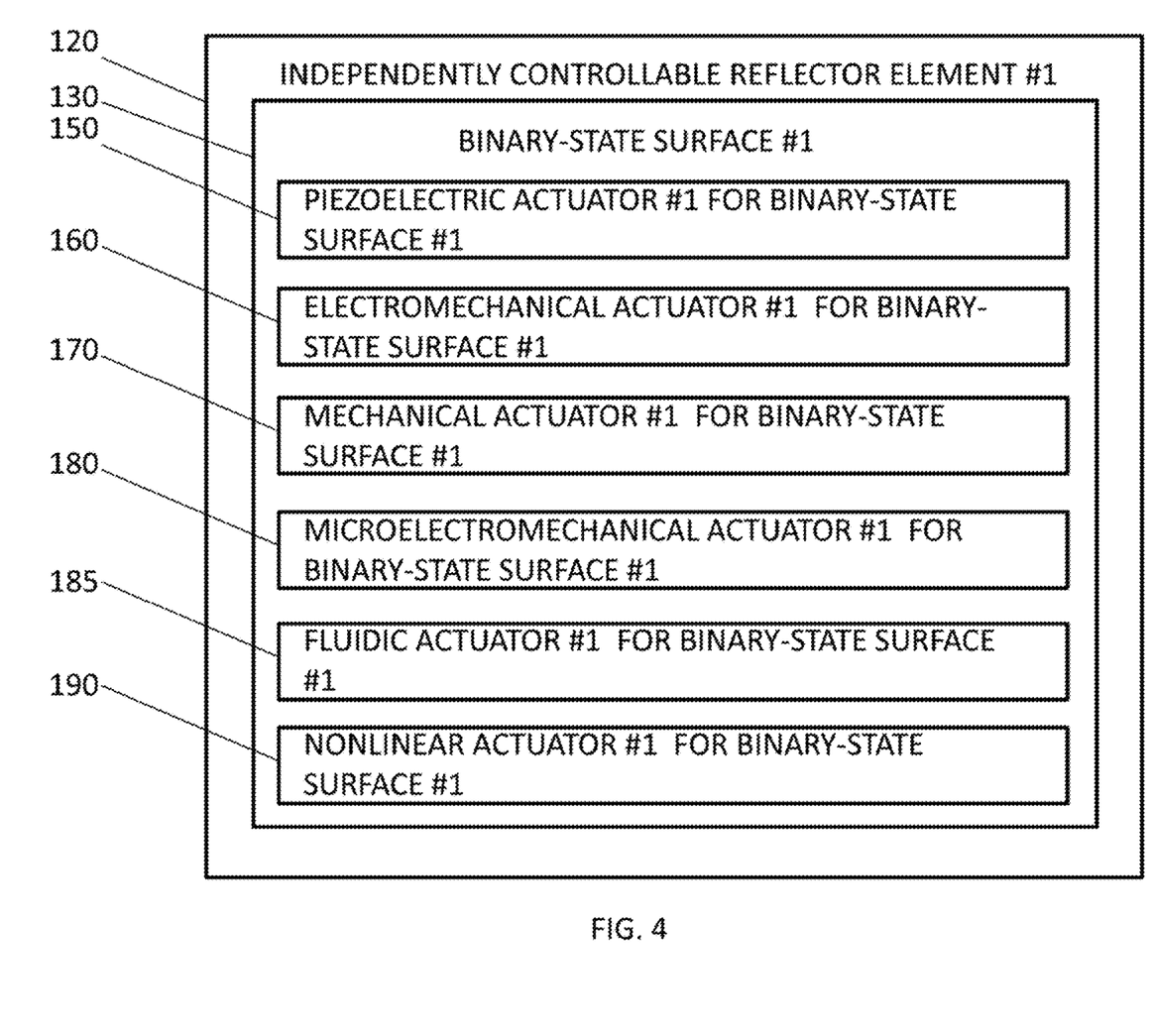
FIG. 4 is a block diagram of a reflectarray according to an embodiment of the invention, the reflectarray including reflector elements.

Optionally, each reflector element of the plurality of independently controllable reflector elements 120, 122 includes a binary-state surface 130, as shown by way of example in FIG. 3, or a tri-state surface 140, as shown by way of example in FIG. 4. Optionally, each binary-state surface 130 includes a standard piezoelectric actuator 150, a standard electromechanical actuator 160, a standard mechanical actuator 170, a standard microelectromechanical actuator 180, a standard fluidic actuator 185, and/or a standard nonlinear actuator 190. For example, as shown by way of illustration in FIGS. 5B and 5C, the electromechanical actuator 160 includes a standard dielectric piston 164 with a metal face to change the capacitive coupling between resonant triangular patches. The dielectric piston 164 is actuated using a standard linear solenoid. The phase shift can be tuned by adjusting the travel of the dielectric piston 164, the diameter of the metal face and/or the gap between the triangular metallic patches. Optionally, each tri-state surface 140 includes a standard piezoelectric actuator 152, a standard electromechanical actuator 162, a standard mechanical actuator 172, a standard microelectromechanical actuator 182, a standard fluidic actuator 187, and/or a standard nonlinear actuator 192.

Optionally, the apparatus 100 further includes a standard feedhorn 200 directed toward the reflectarray 110. The apparatus also includes a standard radiometer 210 receiving energy from the feedhorn 200.

Optionally, the apparatus 100 further includes a computer-readable medium 220 storing instructions that, when executed by a computer 230, cause the computer to cooperate with the reflectarray 110 to carry out a method for generating a retrieved scene from a targeted scene by generating modulated antenna patterns at the reflectarray. The method includes the following. The targeted scene is sampled. Sampling the targeted scene includes generating a plurality of modulated antenna patterns using the reflectarray, and measuring a plurality of antenna temperatures respectively corresponding to the plurality of modulated antenna patterns. The method further includes generating the retrieved scene corresponding to the sampled targeted scene. Generating a retrieved scene corresponding to the sampled targeted scene includes feeding the plurality of modulated antenna patterns and the corresponding plurality of antenna temperatures into a compressive sensing imaging algorithm.

Optionally, the generating a plurality of modulated antenna patterns using the reflectarray 110 includes using a pre-characterized plurality of diverse masks. The pre-characterized plurality of diverse masks being pair-wise mutually incoherent and collectively comprehensive of the targeted scene. Optionally, the pre-characterized plurality of diverse masks includes a pre-characterized plurality of randomly generated masks. Optionally, a number of the plurality of modulated antenna patterns and a number of the plurality of antenna temperatures depend on an expected sparsity level.

Optionally, in an embodiment of the invention employing blind image retrieval, the comprehensive sensing imaging algorithm includes a standard compressive sensing imaging algorithm based on convex optimization, a standard compressive sensing imaging algorithm based on greedy methods, or a standard compressive sensing imaging algorithm based on non-convex optimization.

Optionally, an embodiment of the invention incorporating additional prior knowledge of the scene improves accuracy. In such an embodiment of the invention, the compressive sensing imaging algorithm includes a standard compressive sensing imaging algorithm based on convex optimization, a standard compressive sensing imaging algorithm based on greedy methods, or a standard compressive sensing imaging algorithm based on non-convex optimization. Prior knowledge of the image scene is used as a weighted bias which the various optimization methods leverage to improve brightness temperature accuracy. This involves modifying the inputs into the standard compressive algorithms and the introduction of additional parameters. For example, a standard compressive sensing algorithm based on convex optimization takes the form $$\min_{x} \|Ax - y\|_2^2 + \beta\|x\|_1 \qquad (5)$$

for retrieving an unknown sparse vector x from measurements y, and β is a parameter controlling the amount of sparsity in the solution x. If, for example, we were given a prior estimate of the scene b we could modify the convex optimization program as follows $$\min_{x} \|Ax - y\|_2^2 + \alpha\|Bx - b\|_2^2 + \beta\|x\|_1, \qquad (6)$$

where we have added another parameter α to control the amount of bias towards the prior scene knowledge. Equation (6) does not appear as a convex optimization based standard compressive sensing algorithm, however it can be made to appear so by using a simple linear algebra transformation, $$\tilde{A} = \begin{bmatrix} A \\ \sqrt{\alpha}B \end{bmatrix} \text{ and } \tilde{y} = \begin{bmatrix} y \\ \sqrt{\alpha}b \end{bmatrix}. \qquad (7)$$

Then (6) can be restated in a standard compressive sensing format $$\min_{x} \|\tilde{A}x - \tilde{y}\|_2^2 + \beta\|x\|_1. \qquad (8)$$

The same sort of transformation would be applied for the case of standard non-convex compressive sensing or standard greedy methods based compressive sensing algorithms.

Optionally, an embodiment of the invention incorporating additional prior knowledge of the point-spread function (PSF) of the reflectarray 110 improves resolution. In such an embodiment of the invention, the compressive sensing imaging algorithm includes a compressive sensing imaging algorithm based on standard convex optimization, a compressive sensing imaging algorithm based on standard greedy methods, or a compressive sensing imaging algorithm based on standard non-convex optimization. Under such knowledge of the PSF, a high-resolution estimate of the scene image can be estimated by incorporating additional weighted constraints on the desired solution and is in the form of a constrained compressive sensing algorithm. For example, in this embodiment, a retrieval based on convex optimization would take the form $$\min_{c,x} \|F\Phi^T c - y\|_2^2 + \alpha\|c\|_1 + \beta G(x) \qquad (9)$$

subject to $$\psi^T c = Bx$$

for which c are the desired basis coefficients of the scene, x is the desired high-resolution image of the scene, G(x) is a penalty term that penalizes rapid spatial changes in the image and is given a parameter weight of β, and B is the convolutional matrix attributed to the PSF of the reflectarray. Such a formulation is in the form of a standard convex optimization program. Similar formulations can be used with standard non-convex optimization solvers. Additionally, similar programs in the spirit of (9) can be recast in a form that is amenable to standard greedy methods.

Optionally, the compressive sensing imaging algorithm includes a plurality of algorithm parameters. Generating a retrieved scene corresponding to the sampled targeted scene includes calibrating the comprehensive sensing imaging algorithm. Calibrating the comprehensive sensing imaging algorithm comprising optimizing the plurality of algorithm parameter. Feeding the plurality of modulated antenna patterns and the corresponding plurality of antenna temperatures into a compressive sensing imaging algorithm includes feeding the optimized plurality of algorithm parameters into the compressive sensing imaging algorithm.

Optionally, generating a retrieved scene corresponding to the sampled targeted scene includes estimating a brightness temperature scene from the plurality of modulated antenna patterns and the plurality of antenna temperatures using the compressive sensing algorithm.

Another embodiment of the invention includes a microwave single pixel imager apparatus ("MSPI") 100. The MSPI includes a compressive sensing-supporting aperture (known as the Mechanically-Actuated Reconfigurable Reflectarray ("MARR") 110) and a compressive sensing imaging algorithm ("CSIA") that are coupled with a standard radiometer receiver. The apparatus 100 achieves high accuracy measurements of radiation from a significantly more constrained Size, Weight and Power and Cost ("SWaP") sensor. Pixel angular resolution is significantly improved compared to a diffraction limited reflector of the same dimensions. System and component block diagrams are shown, by way of example, in FIGS. 2-4. The object of an embodiment of the invention is to make a series of measurements, $T_{Ai}$, of the scene:

$$T_{Ai} = \int F_{n,i}(\theta,\varphi) T_{scene}(\theta,\varphi) d\Omega \qquad (10)$$

Where $T_{scene}$ is the scene data and $F_{n,i}(\theta,\varphi)$ are antenna pattern modulations used to sample the scene energy. MSPI incorporates the generation of sampling matrices into the MARR 110 of the system. An intermediate image is not formed on a mask, but rather the electromagnetic properties change, resulting in the creation of different antenna patterns, $F_{n,i}(\theta,\varphi)$.

The MARR 110 generates the sampling patterns, $F_{n,i}$. The sampling patterns must provide proper sampling of the scene, meaning antenna patterns that sense every element of the scene with different known weighting for each sequence, i. The MARR 110 develops these modulated antenna patterns via binary state surfaces ("BSS"). The BSS are independently controllable metasurfaces or frequency-selective surfaces which change electromagnetic properties, in effect producing reflections with specific electrical phases added. An embodiment of the MSPI 100 utilizes a specific distribution of two different BSS, one type switching between a reflection coefficient of near +1/−1 (180 degree phase shift), and a second type switching between reflection coefficients near +1/j (90 degree phase shift). In the current design, approximately 90% of the BSS are of the first type (+1/−1). The remaining elements serve to reduce the symmetry of the beam, improving the retrieval. In order to avoid corrupting the antenna temperature measurements. $T_{A,i}$, extremely high reflectivity, low cross-polarization, and low sidelobe levels, are desirable from the MARR, which requires excellent electrical performance from the BSS elements.

Figure 5A:
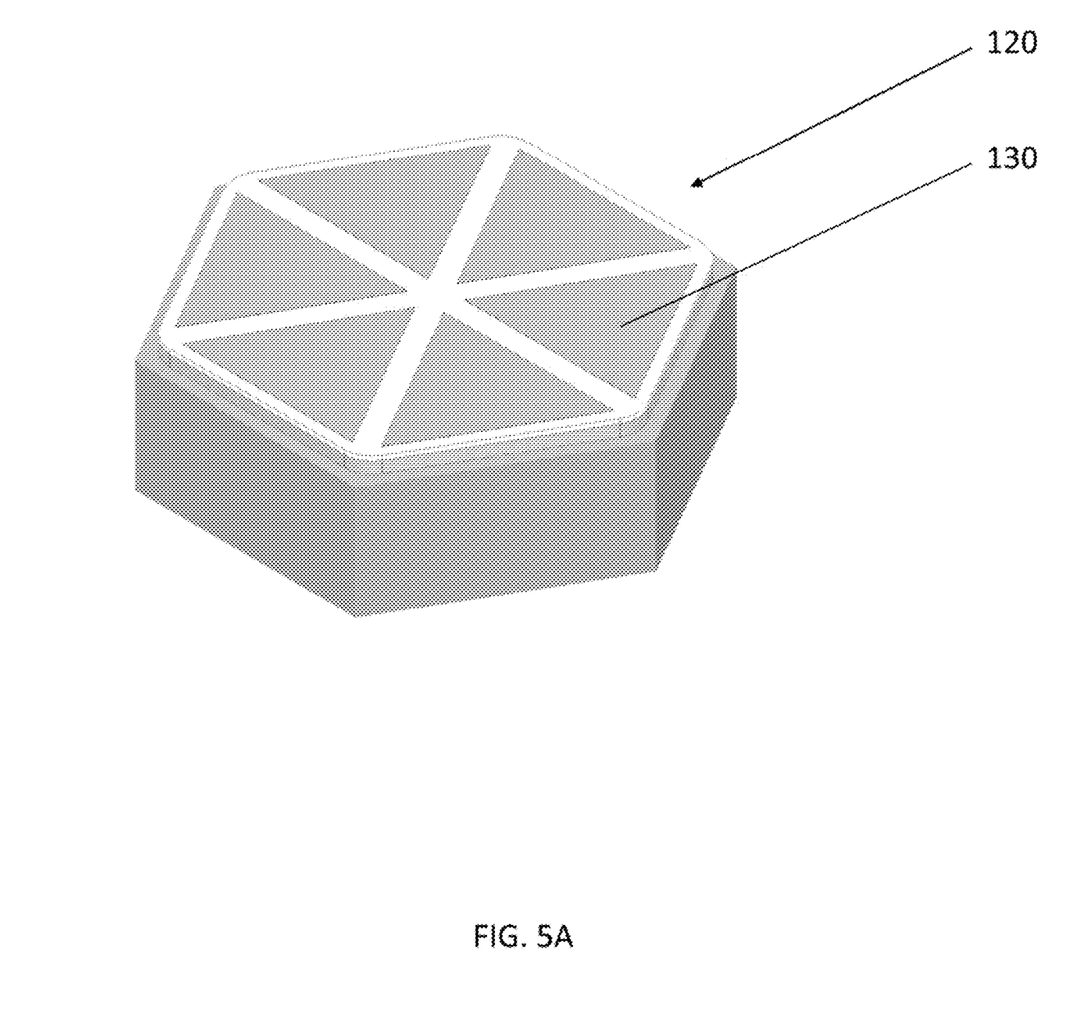
FIG. 5A is a perspective view of an illustrative, single reflector element of a reflectarray, according to an embodiment of the invention, the reflector element being in a coupled state.
Figure 5B:
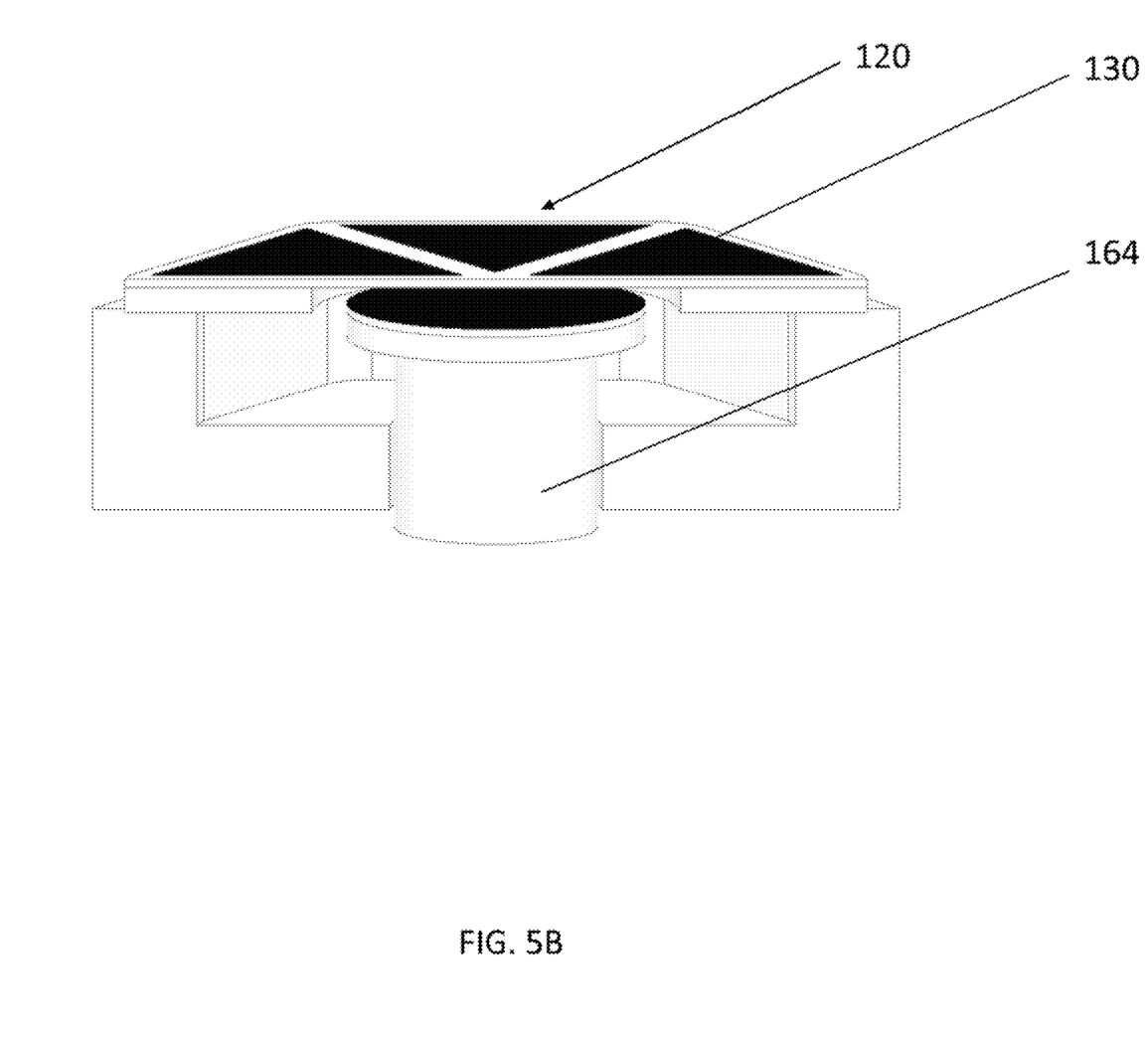
FIG. 5B is a cross-sectional, perspective view of the illustrative reflector element, according to an embodiment of the invention, the reflector element being in a coupled state.
Figure 5C:
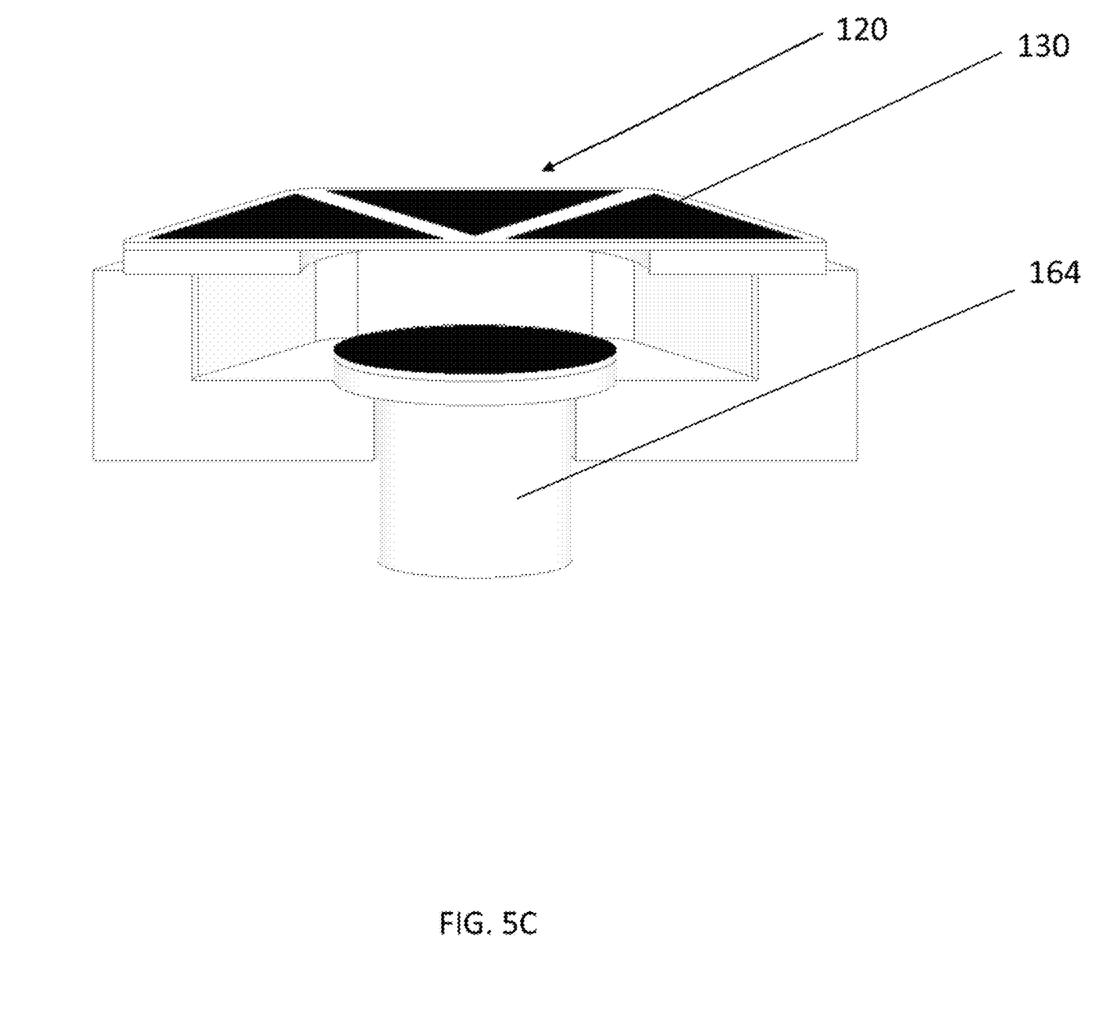
FIG. 5C is a cross-sectional, perspective view of the illustrative reflector element, according to an embodiment of the invention, the reflector element being in a decoupled state.
Figure 6:
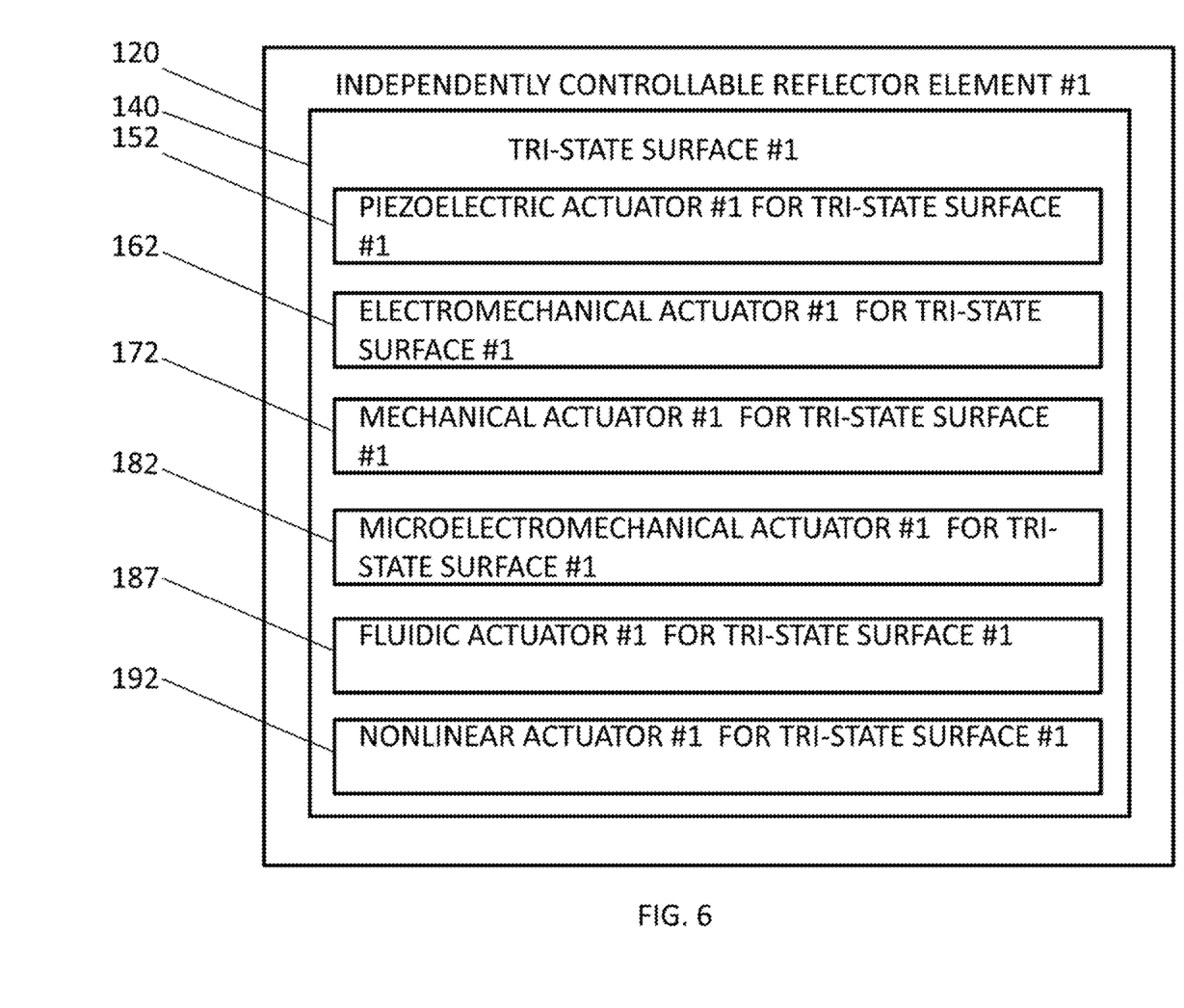
FIG. 6 is a block diagram of a reflectarray according to an embodiment of the invention, the reflectarray including tri-state surfaces.

An embodiment of the BSS elements relies on creation of a resonant structure that protrudes from a ground plane, such as shown by way of illustration in FIGS. 5A-5C. For ease of understanding, FIG. 5A. shows one reflector element. One of ordinary skill in the art will readily appreciate that although FIG. 5A shows a hexagonal reflector element, other shapes are acceptable in alternative embodiments of the invention. Also, one of ordinary skill in the art will readily appreciate that although FIG. 5A shows a resonant structure comprised of six triangular metallic patches, resonators of other shapes and materials are acceptable in alternative embodiments of the invention. As shown in FIGS. 5B and 5C, a standard linear actuator shifts a metallic face to alter the resonance of the six metallic patches of the reflector element between a high position ("a coupled state"), where the substructures resonate to produce a reflection coefficient phase close to that of an open circuit (0°), and a low position ("a decoupled state"), in which proximity to the ground plane limits the coupling between the hexagons yielding a reflection coefficient phase close to that of a short circuit (180°). In such an embodiment of the invention, for example, the phase shift stays within 5 of desired value over 600 MHz bandwidth. In such an embodiment of the invention, for example, this topology exhibits reflectivity of 98.7% or better, and maintains the desired 180° phase shift (+/−15°) for incidence angles of up to 30° off-normal, which is important for a curved parabolic reflector. This embodiment of the invention reaches reflectivity of 99.0%. Still other embodiments of the invention do not require mechanical elements, but the losses are significantly higher. Much effort has been devoted towards achieving reflectivity values that change as little as possible with BSS setting and incidence angle, and in ensuring cross-polarization contributions from the BSS elements are minimal. In another embodiment of the invention, triangles are used as shapes for the reflector elements of the MSPI. The particular shapes for the individual mask elements are chosen to support easier tessellation to integrate into the doubly curved surface of the reflector.

The reflector focal length and offset angle are optimized to both limit the degradation in the performance of BSS elements with increasing incidence angle, and to minimize blockage by the feed horn. The reflector geometry is chosen such that the region of interest ("ROI") for imaging has the proper sampling (over the required set of patterns) while minimizing energy contributions from outside this ROI. A standard feedhorn is used to intercept reflected energy and transfer it to the standard radiometer receiver.

The antenna patterns, multiplied by the scene and integrated over 4π steradians (SR), result in an antenna temperature, $T_a$:

$$T_a = \int F_n(\theta, \varphi) T_{scene}(\theta, \varphi) d\Omega \quad (11)$$

The region of interest, designated $(\theta,\varphi)_{ROI}$, is, generally speaking, only a small fraction of the full 4π SR sphere.

$$T_a = \int F_n(\theta, \varphi) T_{scene}(\theta, \Phi) d\Omega_{ROI} + \int F_n(\theta, \Phi) T_{SL}(\theta, \Phi) d\Omega_{sidelobes} \quad (12)$$

The reflector, whether standard or the MARR 110, further modifies the antenna temperature by having only finite emissivity and cross polarization performance. Calibration techniques for these terms are well known and are not discussed here.

The antenna temperature is in reference to the output of the MARR terminals, and is fed into a standard receiver, to produce a brightness temperature, TB.

$$TB = MT_a + B \quad (13)$$

where both the gain, M, and offset, B, include constants and receiver performance values (constant and fluctuating). For each sequence, i, (and pattern $F_{n,i}$), a brightness temperature, $TB_i$, is measured. The calibration of the brightness temperatures impacts the retrieval accuracy limit, so errors are corrected to the appropriate level such that the result is an image with appropriate noise for the given application. Most receiver error terms are stable over the course of the m measurements required to produce an image, leaving radiometer sensitivity (which can be reduced by either lengthening the integration time or by averaging measurements), and the variation in the antenna from different instantiations as differences between each $TB_i$ which must be considered. Thus, it is important to have emissivity values for the BSS as similar as possible for each setting, and to carefully measure the crosspolarization and sidelobe levels for each pattern, $F_{n,i}$. Careful estimates of $T_{a,XPOL}$ and $T_{SL}$, the crosspolarized and sidelobe energy contributions, respectively, are also necessary.

The calibrated brightness temperatures are fed into the compressive sensing imaging algorithm, which can be remote from the sensor (e.g., being resident on a standard ground station for a spaceborne application), reducing the required onboard processing needs and data transmission bandwidth. The algorithm already has knowledge of the preselected antenna pattern/sequence associated with each measurement. The retrieval algorithm couples a compressive reconstruction to solve the underdetermined aspect of the problem, with a deconvolution approach that seeks to enhance the spatial resolution of the reconstruction. The retrieval algorithm is optimized to provide the required spatial (or effectively angular) resolution and to meet requirements on the accuracy of the retrieval in terms of brightness temperatures compared to the scene on a pixel-by-pixel basis. Minimizing the number of measurements, m, is important to minimize image smearing from platform motion.

Embodiments of the invention include different retrieval algorithms, such as a convex optimization program, which take into account the assumed sparsity prior, as well as computational models of the BSS projection patterns. An iterative first-order numerical optimization solver is, for example, employed as the underlying computational solver for the convex optimization program. In an embodiment of the invention, current retrievals do not rely on any external information such as a priori information about the scene. However, one of ordinary skill in the art will readily appreciate that in alternative embodiments of the invention, such external information can be incorporated to improve the performance.

The image is then, for example, calibrated using typical image processing techniques, such as standard flat fielding. For this purpose, calibration targets with known values and little spatial variation will be used. This is also where a priori knowledge, such as known image features, can be used to good effect.

The retrieved image is a sparse representation of the true scene. There are different choices of bases that may be used to yield a sufficiently sparse approximation to the true scene. The current version represents the underlying image using a representation basis, $\Lambda$.

$$T_{sparse} = \Lambda T_{scene} \tag{14}$$

If the average brightness temperature of the scene is known in advance, this average value could also be subtracted. The difference between the sparsified representation of the image and the true image results in an additional error source, and the choice is made with care.

Portions of the invention operate in a standard computing operating environment, for example, a desktop computer, a laptop computer, a mobile computer, a server computer, and the like, in which embodiments of the invention may be practiced. While the invention is described in the general context of program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, autonomous embedded computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention is described as follows. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media comprise computer storage media and communication media. Computer storage media includes non-transitory, non-volatile, removable and non-removable media implemented in any method or technology for storage of information such as computer-readable instructions, data structures, program modules or other data. Such non-transitory computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems.

The computer may also include an input/output controller for receiving and processing input from a number of other devices, including a keyboard, mouse, etc. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer-implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method comprising:
   Sampling a scene, said sampling the scene comprising:
      generating a plurality of modulated antenna patterns using a reflectarray; and
      measuring a plurality of antenna temperatures respectively corresponding to the plurality of modulated antenna patterns; and
   generating the scene corresponding to the sampled scene, said generating the scene corresponding to the sampled scene comprising:
      feeding the plurality of modulated antenna patterns and the corresponding plurality of antenna temperatures into a compressive sensing imaging algorithm.

2. The method according to claim 1, wherein said generating the plurality of modulated antenna patterns using the reflectarray comprises:
   using a pre-characterized plurality of diverse masks, the pre-characterized plurality of diverse masks being pairwise mutually incoherent and collectively comprehensive of the targeted scene.

3. The method according to claim 2, wherein the pre-characterized plurality of diverse masks comprise a plurality of randomly generated masks.

4. The method according to claim 2, wherein a number of the plurality of modulated antenna patterns and a number of the plurality of antenna temperatures depend on an expected sparsity level.

5. The method according to claim 2, wherein the compressive sensing imaging algorithm comprises one of a compressive sensing imaging algorithm based on convex optimization, a compressive sensing imaging algorithm based on greedy methods, and a compressive sensing imaging algorithm based on non-convex optimization.

6. The method according to claim 1, wherein the compressive sensing imaging algorithm comprises a plurality of algorithm parameters,
   wherein said generating the scene corresponding to the sampled scene comprises:
      calibrating the compressive sensing imaging algorithm, the calibrating the compressive sensing imaging algorithm comprising optimizing the plurality of algorithm parameters,
   wherein said feeding the plurality of modulated antenna patterns and the corresponding plurality of antenna temperatures into a compressive sensing imaging algorithm comprises:
      feeding the optimized plurality of algorithm parameters into the compressive sensing imaging algorithm.

7. The method according to claim 1, wherein said generating the scene corresponding to the sampled scene comprises:
   estimating a brightness temperature scene from the plurality of modulated antenna patterns and the plurality of antenna temperatures using the compressive sensing algorithm.

8. The method according to claim 1, wherein the reflectarray comprises a plurality of independently controllable reflector elements, each reflector element of the plurality of independently controllable reflector elements comprising a corresponding independently controllable reflection coefficient.

9. The method according to claim 8, wherein the corresponding independently controllable reflection coefficient comprises a corresponding independently controllable reflection coefficient phase.

10. The method according to claim 9, wherein the corresponding independently controllable reflection coefficient phase comprises one of a nominal phase state, about 90° from the nominal phase state, and about 180° from the nominal phase state.

11. The method according to claim 8, wherein the each reflector element comprises a multi-state surface.

12. The method according to claim 11, wherein said multi-state surface comprises one of a binary-state surface and a tri-state surface,
   wherein the binary-state surface comprises one of a piezoelectric actuator, an electromechanical actuator, a mechanical actuator, a microelectromechanical actuator, a fluidic actuator, and a nonlinear actuator,
   wherein the tri-state surface comprises one of a piezoelectric actuator, an electromechanical actuator, a mechanical actuator, a microelectromechanical actuator, a fluidic actuator, and a nonlinear actuator.

13. An apparatus comprising:
   a reflectarray comprising:
      a plurality of independently controllable reflector elements, each reflector element of the plurality of independently controllable reflector elements comprising a corresponding independently controllable reflection coefficient;
      a dielectric piston communicating with said each reflector element; and
      a linear solenoid actuating said dielectric piston.

14. The apparatus according to claim 13, wherein the corresponding independently controllable reflection coefficient comprises a corresponding independently controllable reflection coefficient phase.

15. The apparatus according to claim 14, wherein the corresponding independently controllable reflection coefficient phase comprises one of a nominal phase state, about 90° from the nominal phase state, and about 180° from the nominal phase state.

16. The apparatus according to claim 13, wherein the each reflector element comprises a multi-state surface.

17. The apparatus according to claim 16, wherein said multi-state surface comprises one of a binary-state surface and a tri-state surface.

18. The apparatus according to claim 13, further comprising:
a feedhorn directed at said reflectarray; and
a radiometer measuring antenna temperature from said feedhorn.

19. An apparatus comprising:
a reflectarray comprising a plurality of independently controllable reflector elements, each reflector element of the plurality of independently controllable reflector elements comprising a corresponding independently controllable reflection coefficient; and
a computer-readable medium storing instructions that, when executed by a computer, cause the computer to cooperate with said reflectarray to carry out a method, the method comprising:
sampling a scene, the sampling the scene comprising:
generating a plurality of modulated antenna patterns using said reflectarray; and
measuring a plurality of antenna temperatures respectively corresponding to the plurality of modulated antenna patterns; and
generating the scene corresponding to the sampled scene, the generating the scene corresponding to the sampled scene comprising:
feeding the plurality of modulated antenna patterns and the corresponding plurality of antenna temperatures into a compressive sensing imaging algorithm.

20. The apparatus according to claim 19, wherein the generating the plurality of modulated antenna patterns using said reflectarray comprises:
using a pre-characterized plurality of diverse masks, the pre-characterized plurality of diverse masks being pairwise mutually incoherent and collectively comprehensive of the targeted scene.

21. The apparatus according to claim 20, wherein the pre-characterized plurality of diverse masks comprise a plurality of randomly generated masks.

22. The apparatus according to claim 20, wherein a number of the plurality of modulated antenna patterns and a number of the plurality of antenna temperatures depend on an expected sparsity level.

23. The apparatus according to claim 19, wherein the compressive sensing imaging algorithm comprises one of a compressive sensing imaging algorithm based on convex optimization, a compressive sensing imaging algorithm based on greedy methods, and a compressive sensing imaging algorithm based on non-convex optimization.

24. The apparatus according to claim 19, wherein the compressive sensing imaging algorithm comprises a plurality of algorithm parameters,
wherein the generating the scene corresponding to the sampled scene comprises:
calibrating the compressive sensing imaging algorithm, the calibrating the compressive sensing imaging algorithm comprising optimizing the plurality of algorithm parameters,
wherein the feeding the plurality of modulated antenna patterns and the corresponding plurality of antenna temperatures into a compressive sensing imaging algorithm comprises:
feeding the optimized plurality of algorithm parameters into the compressive sensing imaging algorithm.

25. The apparatus according to claim 19, wherein the generating the retrieved scene corresponding to the sampled scene comprises:
estimating a brightness temperature scene from the plurality of modulated antenna patterns and the plurality of antenna temperatures using the compressive sensing algorithm.

* * * * *